United States Patent
Nabeshima et al.

(10) Patent No.: US 8,642,179 B2
(45) Date of Patent: Feb. 4, 2014

(54) INSULATING VARNISH AND PRODUCTION METHOD THEREFOR AND INSULATED ELECTRIC WIRE USING SAME AND PRODUCTION METHOD THEREFOR

(75) Inventors: Shuta Nabeshima, Hitachi (JP); Yuki Honda, Hitachi (JP); Tomiya Abe, Hitachi (JP); Hideyuki Kikuchi, Hitachi (JP); Yasuhiro Funayama, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 279 days.

(21) Appl. No.: 13/027,775

(22) Filed: Feb. 15, 2011

(65) Prior Publication Data

US 2011/0198109 A1  Aug. 18, 2011

(30) Foreign Application Priority Data

Feb. 16, 2010  (JP) .................... 2010-031439

(51) Int. Cl.
 *B05D 5/12* (2006.01)
 *C08L 79/08* (2006.01)
(52) U.S. Cl.
 USPC ........ 428/423.1; 427/120; 428/457; 428/458; 428/474.4; 524/589; 525/528; 525/536
(58) Field of Classification Search
 USPC ............ 428/423.1, 457, 458, 474.4; 525/528, 525/536; 427/120; 524/589
 See application file for complete search history.

(56) References Cited

U.S. PATENT DOCUMENTS

| | | | | |
|---|---|---|---|---|
| 6,475,629 | B1 * | 11/2002 | Takeuchi et al. | 428/450 |
| 2009/0176961 | A1 | 7/2009 | Kikuchi et al. | |
| 2011/0048766 | A1 * | 3/2011 | Kikuchi et al. | 174/110 SR |

FOREIGN PATENT DOCUMENTS

| | | |
|---|---|---|
| JP | 2008-251295 A | 10/2008 |
| JP | 2009-161683 A | 7/2009 |

* cited by examiner

*Primary Examiner* — Ana Woodward (74) *Attorney, Agent, or Firm* — Foley & Lardner LLP (57) ABSTRACT

An insulating varnish includes a polyamide-imide resin including a repeat unit represented by Formula (1) below derived from a synthesis reaction between a resin component (X) and a diisocyanate component (Y). The resin component (X) is derived from a synthesis reaction between a diamine component including aromatic diamines including g a divalent aromatic group (R) including three or more aromatic rings, and an acid component in the presence of an azeotrope solvent. The diisocyanate component (Y) includes a 2,4′-diphenylmethane diisocyanate ($Y_1$) and a 4,4′-diphenylmethane diisocyanate ($Y_2$).

Formula (1):

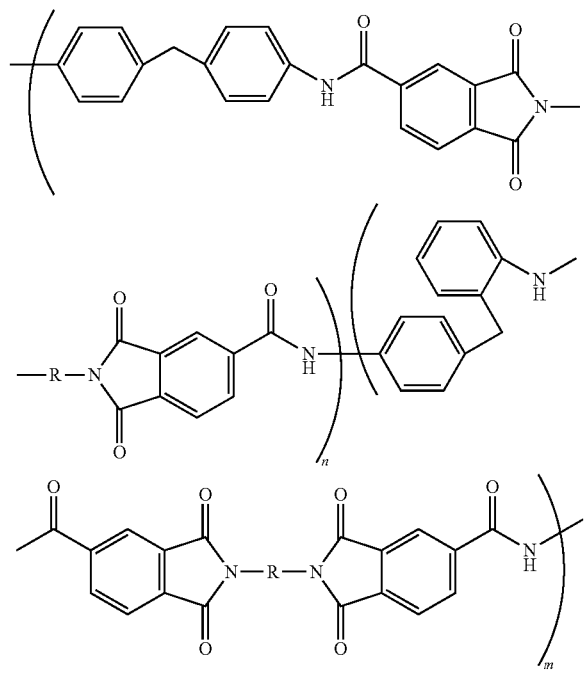

In Formula (1), R denotes the divalent aromatic group including three or more aromatic rings, and m and n denote an integer of from 1 to 99.

10 Claims, 1 Drawing Sheet

FIG.1

1 CONDUCTOR
2 INSULATING COATING
10 INSULATED ELECTRIC WIRE

FIG.2

INSULATING VARNISH AND PRODUCTION METHOD THEREFOR AND INSULATED ELECTRIC WIRE USING SAME AND PRODUCTION METHOD THEREFOR

The present application is based on Japanese patent application No. 2010-031439 filed on Feb. 16, 2010, the entire contents of which are incorporated herein by reference.

BACKGROUND OF THE INVENTION

1. Field of the Invention

This invention relates to an insulating varnish and a production method therefor and an insulated electric wire using the same and a production method therefor. More specifically, it relates to an insulating varnish for use as e.g. an electric wire insulation and a production method for the insulating varnish, and an insulated electric wire having an insulating coating formed by applying the insulating varnish to a conductor surface and a production method for the insulated electric wire, and particularly, to an insulating varnish suitable for coils of electric devices such as motors, transformers or the like, and a production method for the insulating varnish, and an insulated electric wire using the insulating varnish and a production method therefor.

2. Description of the Related Art

Generally, insulated electric wires (enameled wires) are widely used as coils of electric devices such as armatures, transformers or the like. These insulated electric wires include an insulating coating layer comprising one or two or more layers formed around a metal conductor (conductor) having a cross sectional shape (e.g. a circular shape, a rectangular shape) adapted for use as or shape of the coil, by applying thereto and baking an insulating varnish prepared by dissolving a resin such as polyimide, polyamide imide, polyester imide or the like in an organic solvent.

In recent years, the electric devices such as armatures, transformers or the like have been driven by inverter controlling. In such electric devices using inverter controlling, when the inverter surge voltage resulting from inverter controlling is high, the resulting inverter surge voltage may penetrate into the electric device. When in this manner the inverter surge voltage penetrates into the electric device, due to this inverter surge voltage, partial discharge may occur in its insulated electric wire constituting the coil of the electric device. This may degrade or damage its insulating coating.

A known method to prevent such degradation of the insulating coating due to the partial discharge caused by the inverter surge voltage is, for example, to use an insulated electric wire with an insulating coating layer formed around a conductor by applying thereto and baking an insulating varnish derived from dispersion of Organosilicasol™ in a resin solution comprising a polyamide-imide resin, enhance the life (surge resistance) of the insulating coating against the partial discharge, and prevent the degradation or damage of the insulating coating even in the event of the partial discharge (refer to JP-A-2008-251295, for example).

Also, another known method to prevent the degradation of the insulating coating due to the partial discharge caused by the inverter surge voltage is, for example, to use an insulated electric wire with an insulating coating layer formed around a conductor by applying thereto and baking a polyamide-imide resin insulating varnish derived from a reaction between a diisocyanate component and a resin composition derived from a reaction between a diamine component comprising three or more aromatic rings, and an acid component (refer to JP-A-2009-161683, for example). JP-A-2009-161683 uses the above-described insulating varnish for forming the insulating coating, thereby increasing its partial discharge inception voltage (to not less than 900 Vp), and preventing the occurrence of the partial discharge in the insulated electric wire.

Refer to JP-A-2008-251295 and JP-A-2009-161683, for example.

SUMMARY OF THE INVENTION

Further, recently, besides the requirement of the insulated electric wire having a high partial discharge inception voltage (of not less than 900 Vp) as described above, the insulated electric wire has also been required to have a mechanical strength, which allows no cracking even in more severe conditions for coil molding than ever before, because of enhancement of the area proportion occupied by the insulated electric wire resulting from high voltage and enhanced efficiency of motors or transformers.

As an example of such severe conditions, an insulated electric wire with an insulating coating formed around a conductor having a circular cross section is rolled to be formed into a rectangular cross section shape, or this rectangular insulated electric wire is disposed in high density in a stator so as to be molded into a coil, to enhance the area proportion occupied by it. There have been the problem that such a case causes cracking of the insulating coating, and degradation in the insulating properties such as the partial discharge inception voltage and the like.

It is an object of the present invention to provide an insulating varnish capable of forming an insulating coating having a partial discharge inception voltage, which is equivalent to that of the prior art, and a mechanical strength, which allows no cracking during rolling or coil molding, and a production method for the insulating varnish, and an insulated electric wire using the insulating varnish and a production method therefor.

(1) According to one embodiment of the invention, an insulating varnish comprises:

a polyamide-imide resin comprising a repeat unit represented by Formula (1) below derived from a synthesis reaction between a resin component (X) and a diisocyanate component (Y), wherein the resin component (X) is derived from a synthesis reaction between a diamine component comprising aromatic diamines comprising a divalent aromatic group (R) comprising three or more aromatic rings, and an acid component in the presence of an azeotrope solvent, and the diisocyanate component (Y) comprises a 2,4'-diphenylmethane diisocyanate ($Y_1$) and a 4,4'-diphenylmethane diisocyanate ($Y_2$).

Formula (1):

In Formula (1), R denotes the divalent aromatic group comprising three or more aromatic rings, and m and n denote an integer of from 1 to 99.

In the above embodiment (1) of the invention, the following modifications and changes can be made.

(i) The mixing rate of the 2,4'-diphenylmethane diisocyanate ($Y_1$) to the 4,4'-diphenylmethane diisocyanate ($Y_2$) composing the diisocyanate component (Y) ranges from 10 to 90% in $[\{Y_1/(Y_1+Y_2)\}\times 100]$ mole percent.

(ii) The aromatic diamines comprising a divalent aromatic group (R) comprising three or more aromatic rings are at least one compound selected from the group consisting of a 2,2-bis[4-(4-aminophenoxy)phenyl]propane (BAPP), bis[4-(4-aminophenoxy)phenyl]sulfone, bis[4-(4-aminophenoxy)phenyl]ether, 9,9-bis(4-aminophenyl)fluorene, 4,4'-bis(4-aminophenoxy)biphenyl, 1,4-bis(4-aminophenoxy)benzene, and isomers thereof.

(iii) The azeotrope solvent comprises xylene.

(2) According to another embodiment of the invention, an insulating varnish producing method comprises:

making a synthesis reaction between a diamine component comprising aromatic diamines comprising a divalent aromatic group (R) comprising three or more aromatic rings, and an acid component in the presence of an azeotrope solvent, to produce a resin component (X); and making a synthesis reaction between the resultant resin component (X), and a diisocyanate component (Y) comprising a 2,4'-diphenylmethane diisocyanate ($Y_1$) and a 4,4'-diphenylmethane diisocyanate ($Y_2$), to produce an insulating varnish containing a polyamide-imide resin comprising a repeat unit represented by Formula (1) below.

Formula (1):

In Formula (1), R denotes the divalent aromatic group comprising three or more aromatic rings, and m and n denote an integer of from 1 to 99.

In the above embodiment (2) of the invention, the following modifications and changes can be made.

(iv) The mixing rate of the 2,4'-diphenylmethane diisocyanate ($Y_1$) to the 4,4'-diphenylmethane diisocyanate ($Y_2$) composing the diisocyanate component (Y) ranges from 10 to 90% in $[\{Y_1/(Y_1+Y_2)\}\times 100]$ mole percent.

(v) The aromatic diamines comprising a divalent aromatic group (R) comprising three or more aromatic rings are at least one compound selected from the group consisting of a 2,2-bis[4-(4-aminophenoxy)phenyl]propane (BAPP), bis[4-(4-aminophenoxy)phenyl]sulfone, bis[4-(4-aminophenoxy)

phenyl]ether, 9,9-bis(4-aminophenyl)fluorene, 4,4'-bis(4-aminophenoxy)biphenyl, 1,4-bis(4-aminophenoxy)benzene, and isomers thereof.

(vi) The azeotrope solvent comprises xylene.

(3) According to another embodiment of the invention, an insulated electric wire comprises:

a conductor or another insulating coating; and the insulating varnish according to the embodiment (1) applied thereto and baked to form an insulating coating.

In the above embodiment (3) of the invention, the following modifications and changes can be made.

(vii) The insulated electric wire has a substantially rectangular cross section.

(4) According to another embodiment of the invention, an insulated electric wire production method comprises:

applying the insulating varnish according to the embodiment (1) to a conductor having a circular cross section, and baking it to thereby form an insulating coating; and rolling the conductor and the insulating coating, to form an insulated electric wire having a substantially rectangular cross section.

Points of the Invention

According to one embodiment of the invention, an insulating varnish contains a polyamide-imide resin comprising a repeat unit represented by Formula (1). By use of the insulating varnish containing the polyamide-imide resin comprising a repeat unit represented by Formula (1), it is possible to form an insulating coating having a high partial discharge inception voltage, which is equivalent to that of the prior art, and an excellent mechanical strength, which allows no cracking during rolling or coil molding.

According to one embodiment of the invention, even when forming an insulated electric wire with a substantially rectangular cross section in order to enhance the area proportion occupied by it, its coating can be uniformly formed more easily than when applying the insulating varnish directly to the substantially rectangular conductor. That is, although the polyamide-imide insulating varnish, when applied directly to the substantially rectangular conductor having a substantially rectangular cross section, is difficult to form uniformly due to surface tension of the varnish, the invention allows the uniform coating to be easily formed by being applied to the circular conductor having a circular cross section less affected by the surface tension of the varnish, baked and rolled into the substantially rectangular conductor.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

Below are described embodiments of an insulating varnish and a production method therefor and an insulated electric wire using the same and a production method therefor, according to the invention.

I: Insulating Varnish and Production Method Therefor

An insulating varnish in this embodiment contains a polyamide-imide resin comprising a repeat unit represented by the previously described Formula (1) derived from a synthesis reaction (second step synthesis reaction) between a resin component (X) and a diisocyanate component (Y), wherein the resin component (X) is derived from a synthesis reaction (first step synthesis reaction) between a diamine component comprising aromatic diamines comprising a divalent aromatic group (R) comprising three or more aromatic rings, and an acid component in the presence of an azeotrope solvent, and the diisocyanate component (Y) comprises a 2,4'-diphenylmethane diisocyanate ($Y_1$) and a 4,4'-diphenylmethane diisocyanate ($Y_2$).

Also, an insulating varnish production method in this embodiment comprises: making a synthesis reaction between a diamine component comprising aromatic diamines comprising a divalent aromatic group (R) comprising three or more aromatic rings, and an acid component in the presence of an azeotrope solvent, to produce a resin component (X); and making a synthesis reaction between the resultant resin component (X), and a diisocyanate component (Y) comprising a 2,4'-diphenylmethane diisocyanate ($Y_1$) and a 4,4'-diphenylmethane diisocyanate ($Y_2$), to produce an insulating varnish containing a polyamide-imide resin comprising a repeat unit represented by the previously described Formula (1).

In short, the insulating varnish in this embodiment contains the polyamide-imide resin derived from the synthesis reaction between the resin component (X) and the diisocyanate component (Y). Here, the mixing rate of the resin component (X) and the diisocyanate component (Y) is not particularly limited, provided that it allows efficient production of the polyamide-imide resin. The resin component (X) and the diisocyanate component (Y) are specifically described below.

I-1: Resin Component (X) Synthesis

The resin component (X) is derived from the synthesis reaction (first step synthesis reaction) between the diamine component and the acid component in the presence of the azeotrope solvent.

Diamine Component

The diamine component, which is one synthesis reaction component to produce the resin component (X), comprises aromatic diamines comprising a divalent aromatic group (R) comprising three or more aromatic rings. The aromatic diamines comprising a divalent aromatic group (R) comprising three or more aromatic rings may be at least one compound selected from the group consisting of a 2,2-bis[4-(4-aminophenoxy)phenyl]propane (BAPP), bis[4-(4-aminophenoxy)phenyl]sulfone, bis[4-(4-aminophenoxy)phenyl]ether, 9,9-bis(4-aminophenyl)fluorene, 4,4'-bis(4- aminophenoxy)biphenyl, 1,4-bis(4-aminophenoxy)benzene, and isomers thereof, for example. The divalent aromatic group (R) comprising three or more aromatic rings is a residue (divalent aromatic group) remaining after two amino groups are removed from the above-described aromatic diamines. Also, the reason for the aromatic diamines comprising a divalent aromatic group (R) comprising three or more aromatic rings being used as the diamine component is because the use of the aromatic diamines thus composed can reduce the rate of the amide group and the imide group present in the resultant final polyamide-imide resin, thereby reduce the dielectric constant of the polyamide-imide resin, and make the partial discharge voltage thereof high.

Acid Component

The acid component, which is the other synthesis reaction component to produce the resin component (X), is not particularly limited, provided that it can make a synthesis reaction with the above-described diamine component in the presence of the azeotrope solvent to synthesize the resin component (X). The acid component may be an aromatic tricarboxylic anhydride, or an aromatic tetracarboxylic dianhydride, for example. Specifically, it may be a trimellitic anhydride (TMA), a benzophenone tricarboxylic anhydride or the like. Among others, the trimellitic anhydride (TMA) is preferred from the point of view of cost. The mixing rate of the diamine component and the acid component is not particularly limited, provided that it allows efficient production of the resin component (X).

Azeotrope Solvent

The resin component (X) synthesis reaction (first step synthesis reaction) is made in the presence of the azeotrope solvent, in addition to a general solvent, such as a N-methyl-2-pyrrolidone. This is because of facilitating removal of water resulting from the synthesis reaction, and increasing the efficiency of the synthesis reaction, such as the imidization rate. This can, when used for the resultant final polyamide-imide resin containing insulating varnish for forming an electric wire insulating coating, result in the coating having an excellent flexibility after 30% elongation and a high partial discharge inception voltage. The azeotrope solvent may be, for example a xylene, toluene, benzene, ethyl benzene, or the like, but among others, the xylene is preferred from the point of view of dangerous and harmful effects, and from the point of view of the more effective properties of the invention.

I-2: Diisocyanate Component (Y) Composition

The diisocyanate component (Y), which makes the synthesis reaction (second step synthesis reaction) with the above-described resin component (X) to produce the final polyamide-imide resin contained in the insulating varnish in this embodiment, comprises a 2,4'-diphenylmethane diisocyanate ($Y_1$) and a 4,4'-diphenylmethane diisocyanate ($Y_2$).

Mixing Rate of $Y_1$ to $Y_2$

The mixing rate of the 2,4'-diphenylmethane diisocyanate ($Y_1$) to the 4,4'-diphenylmethane diisocyanate ($Y_2$) composing the diisocyanate component (Y) ranges preferably from 10 to 90% in [{$Y_1$/($Y_1$+$Y_2$)}×100] mole percent, more preferably from 25 to 90%, most preferably from 40 to 80%. The mixing rate ranging from 10 to 90 mole % can, when used for the resultant final polyamide-imide resin containing insulating varnish for forming an electric wire insulating coating, effectively result in the coating having a high partial discharge inception voltage and an excellent mechanical strength (flexibility after 30% elongation). In particular, the mixing rate ranging from 25 to 90 mole % can result in the insulating coating having an excellent property of close adhesion to a conductor in a peel test or a twist test, in addition to the above properties.

I-3: Synthesis Reaction (Second Step Synthesis Reaction) Between Resin Component (X) and Diisocyanate Component (Y)

The method of the second step synthesis reaction between the resin component (X) derived from the first step synthesis reaction and the diisocyanate component (Y) is not particularly limited, provided that it allows efficient production of the resultant final polyamide-imide resin. For example, when the diisocyanate component (Y) is added to the resin component (X), the 2,4'-diphenylmethane diisocyanate ($Y_1$) and the 4,4'-diphenylmethane diisocyanate ($Y_2$) may be first mixed together to form a mixture thereof, and this mixture then added to the resin component (X), or the 2,4'-diphenylmethane diisocyanate ($Y_1$) and the 4,4'-diphenylmethane diisocyanate ($Y_2$) may, without being mixed together, be singly and separately added to the resin component (X). It should be noted, however, that the latter case needs taking account of reactivity. Also, for the second step synthesis reaction to produce the polyamide-imide resin, a reactive catalyst, such as amines, imidazoles, imidazolines or the like, may be used, provided that it does not interfere with the stability of the varnish. Also, when the second step synthesis reaction terminates, a terminator such as an alcohol or the like may be used. In this manner, the final polyamide-imide resin comprising the repeat unit represented by the previously described Formula (1) can be derived.

I-4: Insulating Varnish Preparation

As a method to prepare a final insulating varnish from the polyamide-imide resin derived from the above-described second step synthesis reaction, there may be used a versatile method.

II: Insulated Electric Wire and Production Method Therefor

Figure 1:
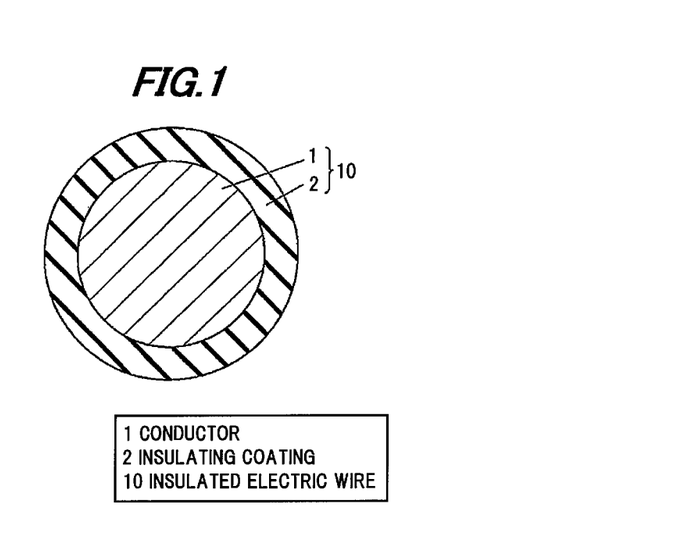
FIG. 1 is a cross sectional view typically showing an insulated electric wire having a circular cross section in an embodiment according to the invention.
Figure 2:
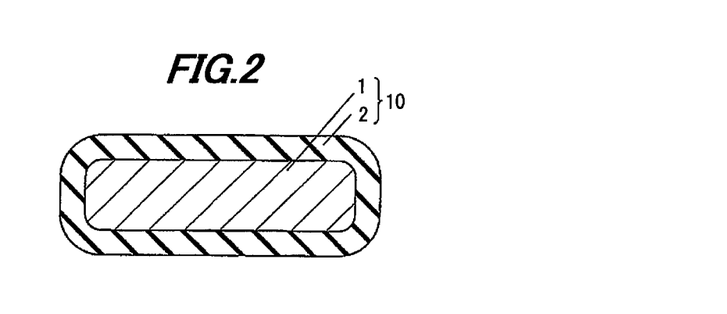
FIG. 2 is a cross sectional view typically showing an insulated electric wire having a substantially rectangular cross section in an embodiment according to the invention.

Referring to FIGS. 1 and 2, insulated electric wires 10 respectively in this embodiment are each configured as including a conductor 1 or another insulating coating (not shown), and the above-described insulating varnish applied thereto and baked to form an insulating coating 2. The insulated electric wire 10 shown in FIG. 1 has a circular cross section, while the insulated electric wire 10 shown in FIG. 2 has a substantially rectangular cross section.

Also, an insulated electric wire production method in this embodiment comprises: applying the above-described insulating varnish to a conductor having a circular cross section, and baking it to form an insulating coating; and rolling the conductor and the insulating coating, to form an insulated electric wire having a substantially rectangular cross section.

The method to apply the insulating varnish to a conductor or another insulating coating and bake it is not particularly limited. For example, the conductor typically uses a copper, but may be a copper plated with a metal such as nickel therearound, or a copper formed with another insulating coating therearound. Also, when the insulated electric wire is lubricated, it is preferred to apply a lubricating oil to its outermost layer, or apply a lubricating resin varnish to its outermost layer and bake it, or apply to the conductor and bake a base enameled wire varnish with one or more lubricants such as a solid paraffin, a low molecular polyethylene, an alicyclic ester based wax, and a silicon resin mixed therein. As described above, the insulated electric wire production method in this embodiment is especially effective in forming an insulated electric wire having a substantially rectangular cross section, because of enhancing the area proportion occupied by it.

III: Advantages of the Embodiment

The use of the insulating varnish produced in this embodiment for electric wire insulating coating formation can result in the insulated electric wire having a flexibility of 1d (d: minimum winding diameter) after 30% elongation, and therefore an excellent mechanical strength, which allows no cracking of its insulating coating during rolling or coil molding, and a high partial discharge inception voltage (of not less than 970 Vp), as with the prior art.

EXAMPLES

The insulating varnish and its production method and the insulated electric wire and its production method according to the invention are more specifically described below using examples. The invention is not limited in any way by the below-described examples.

Example 1

Polyamide-Imide Resin A Synthesis

In a flask with a stirrer, a reflux condenser tube, a nitrogen inlet tube, and a thermometer, 446.5 g of 2,2-bis[4-(4-aminophenoxy)phenyl]propane (BAPP) and 449.2 g of trimellitic anhydride (TMA) are combined, 2515.9 g of N-methyl-2-pyrrolidone is added as a solvent, and 252 g of xylene is added as an azeotrope solvent, followed by 6 hour reaction at a stirring of 180 rpm, at a nitrogen flow of 1 L/min, and at a system temperature of 180 degrees Celsius. The reaction is made with the water and xylene produced during dehydration reaction being vented to outside the system as needed. This results in the resin component (X). The resin component (X) is cooled down to 90 degrees Celsius, and thereafter 313.4 g of diisocyanate component (Y) produced of a 50-50 mixture of 2,4'-diphenylmethane diisocyanate ($Y_1$) and 4,4'-diphenylmethane diisocyanate ($Y_2$) (i.e. $Y_1$ mol percent=50%) is combined thereinto, followed by 4 hour reaction at a stirring of 150 rpm, at a nitrogen flow of 0.1 L/min, and at a system temperature of 140 degrees Celsius. Subsequently, 88.4 g of benzyl alcohol and 628.9 g of N,N-dimethylformamide are combined thereinto to terminate the reaction. This results in polyamide-imide resin A having a viscosity of from approximately 2000 to 3000 mPa·s measured with an E-type viscometer. Following that, the polyamide-imide resin A is applied to around a copper wire having a conductor diameter of 0.82 mm. This is baked, thereby resulting in the insulated electric wire having the 45 μm insulating coating layer.

Example 2

Polyamide-Imide Resin B Synthesis

In a flask with a stirrer, a reflux condenser tube, a nitrogen inlet tube, and a thermometer, 446.5 g of 2,2-bis[4-(4-aminophenoxy)phenyl]propane (BAPP) and 449.2 g of trimellitic anhydride (TMA) are combined, 2515.9 g of N-methyl-2-pyrrolidone is added as a solvent, and 252 g of xylene is added as an azeotrope solvent, followed by 6 hour reaction at a stirring of 180 rpm, at a nitrogen flow of 1 L/min, and at a system temperature of 180 degrees Celsius. The reaction is made with the water and xylene produced during dehydration reaction being vented to outside the system as needed. This results in the resin component (X). The resin component (X) is cooled down to 90 degrees Celsius, and thereafter 316.4 g of diisocyanate component (Y) produced of a 40-60 mixture of 2,4'-diphenylmethane diisocyanate ($Y_1$) and 4,4'-diphenylmethane diisocyanate ($Y_2$) (i.e. $Y_1$ mol percent=40%) is combined thereinto, followed by 4 hour reaction at a stirring of 150 rpm, at a nitrogen flow of 0.1 L/min, and at a system temperature of 140 degrees Celsius. Subsequently, 88.4 g of benzyl alcohol and 628.9 g of N,N-dimethylformamide are combined thereinto to terminate the reaction. This results in polyamide-imide resin B having a viscosity of from approximately 2000 to 3000 mPa·s measured with an E-type viscometer. Following that, the polyamide-imide resin B is applied to around a copper wire having a conductor diameter of 0.82 mm. This is baked, thereby resulting in the insulated electric wire having the 45 μm insulating coating layer.

Example 3

Polyamide-Imide Resin C Synthesis

In a flask with a stirrer, a reflux condenser tube, a nitrogen inlet tube, and a thermometer, 446.5 g of 2,2-bis[4-(4-aminophenoxy)phenyl]propane (BAPP) and 449.2 g of trimellitic anhydride (TMA) are combined, 2515.9 g of N-methyl-2-pyrrolidone is added as a solvent, and 252 g of xylene is added as an azeotrope solvent, followed by 6 hour reaction at a stirring of 180 rpm, at a nitrogen flow of 1 L/min, and at a system temperature of 180 degrees Celsius. The reaction is made with the water and xylene produced during dehydration reaction being vented to outside the system as needed. This results in the resin component (X). The resin component (X) is cooled down to 90 degrees Celsius, and thereafter 316.4 g of diisocyanate component (Y) produced of a 25-75 mixture of 2,4'-diphenylmethane diisocyanate ($Y_1$) and 4,4'-diphenylmethane diisocyanate ($Y_2$) (i.e. $Y_1$ mol percent=25%) is combined thereinto, followed by 4 hour reaction at a stirring of 150 rpm, at a nitrogen flow of 0.1 L/min, and at a system temperature of 140 degrees Celsius. Subsequently, 88.4 g of benzyl alcohol and 628.9 g of N,N-dimethylformamide are combined thereinto to terminate the reaction. This results in polyamide-imide resin C having a viscosity of from approximately 2000 to 3000 mPa·s measured with an E-type viscometer. Following that, the polyamide-imide resin C is applied to around a copper wire having a conductor diameter of 0.82 mm. This is baked, thereby resulting in the insulated electric wire having the 45 μm insulating coating layer.

Example 4

Polyamide-Imide Resin D Synthesis

In a flask with a stirrer, a reflux condenser tube, a nitrogen inlet tube, and a thermometer, 446.5 g of 2,2-bis[4-(4-aminophenoxy)phenyl]propane (BAPP) and 449.2 g of trimellitic anhydride (TMA) are combined, 2515.9 g of N-methyl-2-pyrrolidone is added as a solvent, and 252 g of xylene is added as an azeotrope solvent, followed by 6 hour reaction at a stirring of 180 rpm, at a nitrogen flow of 1 L/min, and at a system temperature of 180 degrees Celsius. The reaction is made with the water and xylene produced during dehydration reaction being vented to outside the system as needed. This results in the resin component (X). The resin component (X) is cooled down to 90 degrees Celsius, and thereafter 316.4 g of diisocyanate component (Y) produced of a 80-20 mixture of 2,4'-diphenylmethane diisocyanate ($Y_1$) and 4,4'-diphenylmethane diisocyanate ($Y_2$) (i.e. $Y_1$ mol percent=80%) is combined thereinto, followed by 4 hour reaction at a stirring of 150 rpm, at a nitrogen flow of 0.1 L/min, and at a system temperature of 140 degrees Celsius. Subsequently, 88.4 g of benzyl alcohol and 628.9 g of N,N-dimethylformamide are combined thereinto to terminate the reaction. This results in polyamide-imide resin D having a viscosity of from approximately 2000 to 3000 mPa·s measured with an E-type viscometer. Following that, the polyamide-imide resin D is applied to around a copper wire having a conductor diameter of 0.82 mm. This is baked, thereby resulting in the insulated electric wire having the 45 μm insulating coating layer.

Example 5

Polyamide-Imide Resin E Synthesis

In a flask with a stirrer, a reflux condenser tube, a nitrogen inlet tube, and a thermometer, 446.5 g of 2,2-bis[4-(4-aminophenoxy)phenyl]propane (BAPP) and 449.2 g of trimellitic anhydride (TMA) are combined, 2515.9 g of N-methyl-2-pyrrolidone is added as a solvent, and 252 g of xylene is added as an azeotrope solvent, followed by 6 hour reaction at a stirring of 180 rpm, at a nitrogen flow of 1 L/min, and at a system temperature of 180 degrees Celsius. The reaction is made with the water and xylene produced during dehydration reaction being vented to outside the system as needed. This results in the resin component (X). The resin component (X) is cooled down to 90 degrees Celsius, and thereafter 316.4 g of diisocyanate component (Y) produced of a 90-10 mixture of 2,4'-diphenylmethane diisocyanate ($Y_1$) and 4,4'-diphenylmethane diisocyanate ($Y_2$) (i.e. $Y_1$ mol percent=90%) is combined thereinto, followed by 4 hour reaction at a stirring of 150 rpm, at a nitrogen flow of 0.1 L/min, and at a system temperature of 140 degrees Celsius. Subsequently, 88.4 g of benzyl alcohol and 628.9 g of N,N-dimethylformamide are combined thereinto to terminate the reaction. This results in polyamide-imide resin E having a viscosity of from approximately 2000 to 3000 mPa·s measured with an E-type viscometer. Following that, the polyamide-imide resin E is applied to around a copper wire having a conductor diameter of 0.82 mm. This is baked, thereby resulting in the insulated electric wire having the 45 μm insulating coating layer.

Example 6

Polyamide-Imide Resin F Synthesis

In a flask with a stirrer, a reflux condenser tube, a nitrogen inlet tube, and a thermometer, 446.5 g of 2,2-bis[4-(4-aminophenoxy)phenyl]propane (BAPP) and 449.2 g of trimellitic anhydride (TMA) are combined, 2515.9 g of N-methyl-2-pyrrolidone is added as a solvent, and 252 g of xylene is added as an azeotrope solvent, followed by 6 hour reaction at a stirring of 180 rpm, at a nitrogen flow of 1 L/min, and at a system temperature of 180 degrees Celsius. The reaction is made with the water and xylene produced during dehydration reaction being vented to outside the system as needed. This results in the resin component (X). The resin component (X) is cooled down to 90 degrees Celsius, and thereafter 316.4 g of diisocyanate component (Y) produced of a 10-90 mixture of 2,4'-diphenylmethane diisocyanate ($Y_1$) and 4,4'-diphenylmethane diisocyanate ($Y_2$) (i.e. $Y_1$ mol percent=10%) is combined thereinto, followed by 4 hour reaction at a stirring of 150 rpm, at a nitrogen flow of 0.1 L/min, and at a system temperature of 140 degrees Celsius. Subsequently, 88.4 g of benzyl alcohol and 628.9 g of N,N-dimethylformamide are combined thereinto to terminate the reaction. This results in polyamide-imide resin F having a viscosity of from approximately 2000 to 3000 mPa·s measured with an E-type viscometer. Following that, the polyamide-imide resin F is applied to around a copper wire having a conductor diameter of 0.82 mm. This is baked, thereby resulting in the insulated electric wire having the 45 μm insulating coating layer.

Property Test

Partial Discharge Inception Voltage (PDIV)

For each of the resultant insulated electric wires of Examples 1 to 6, the partial discharge inception voltage (PDIV) is measured. 10 twisted pair enameled wire samples are made, and the coating resin thereof is stripped 10 mm from an end with an Abisofix wire stripping device. Subsequently, for coating resin drying, the coating resin is heated at 125 degrees Celsius in a constant temperature tank for 30 minutes, and left unattended in a desiccator for 18 hours until reaching room temperature. The measurement is made using a partial discharge automatic test system (DAC-PD-3 made by Soken Electric Co., Ltd.), in an atmosphere at 23 degrees Celsius and at a humidity of 50%, with 50 Hz voltage being boosted at a rate of 10 to 30 V/s, and defining as the partial discharge inception voltage (PDIV) a voltage at which a discharge of 100 pC occurs in an enameled wire sample 50 times per second. Results thereof are shown in Table 1.

Flexibility

Each of the resultant insulated electric wires of Examples 1 to 6 is elongated by 30%, and is thereafter wound five turns (=one coil)×five around round bars (winding bars) having smooth surfaces and diameters of from 1 to 10 times respectively the conductor diameter. The flexibility is expressed in terms of a multiple of the minimum winding diameter (=d) at which no cracking is seen in the insulating coating during the winding. Results thereof are shown in Table 1.

Twist Test

For each of the resultant insulated electric wires of Examples 1 to 6, the twist test is performed as follows. A straight electric wire sample is coaxially fixed to two clamps spaced 250 mm apart, one of the two clamps is rotated, and its rotation angle (=number of times of rotation, defined as being one when that clamp is rotated through 360 degrees) at the point of coating separation is measured. Results thereof are shown in Table 1.

Peel Test

For each of the resultant insulated electric wires of Examples 1 to 6, the peel test is performed as follows. A straight electric wire sample is coaxially fixed to two clamps spaced 250 mm apart, and two parallel longitudinal side coating portions of that sample are removed to reach its conductor. Thereafter, one of the two clamps is rotated, and its rotation angle (=number of times of rotation, defined as being one when that clamp is rotated through 360 degrees) at the point of coating separation is measured. Results thereof are shown in Table 1.

Comparative Example 1

Versatile Polyamide-Imide Resin G Synthesis

In a 5 L three-necked flask with a stirrer, a nitrogen line, and a Dimroth condenser tube attached thereto, 375.5 g of 4,4'-diphenylmethane diisocyanate and 634.5 g of trimellitic anhydride (TMA) are combined, and 2375 g of N-methyl-2-pyrrolidone (NMP) is added as a solvent, followed by 30 minute stirring at 150 rpm, at a nitrogen flow of 1 L/min, and at a system temperature of 120 degrees Celsius, and subsequently increasing the temperature to 155 degrees Celsius, and 3 hour stirring. This results in a reactive intermediate in the first step synthesis reaction. The reactive intermediate is then cooled down to 60 degrees Celsius, and thereafter 375.5 g of 4,4'-diphenylmethane diisocyanate ($Y_2$) is added thereto, followed by approximately 1 hour reaction at 150 rpm, at a nitrogen flow of 0.1 L/min, and at a system temperature of 120 degrees Celsius. Subsequently, methanol and N-methyl-2-pyrrolidone (NMP) are combined thereinto to terminate the reaction. This results in polyamide-imide resin G having a viscosity of from approximately 2000 to 3000 mPa·s measured with an E-type viscometer. Following that, the polyamide-imide resin G is applied to around a copper wire having a conductor diameter of 0.82 mm. This is baked, thereby resulting in the insulated electric wire having the 45 μm insulating coating layer.

Comparative Example 2

Prior-Art Polyamide-Imide Resin H Synthesis

In a flask with a stirrer, a nitrogen inlet tube, and a thermometer, 446.5 g of 2,2-bis[4-(4-aminophenoxy)phenyl] propane (BAPP) and 449.3 g of trimellitic anhydride (TMA) are combined, and 2542.1 g of N-methyl-2-pyrrolidone is added as a solvent, followed by 4 hour reaction at 180 rpm, at a nitrogen flow of 1 L/min, and at a system temperature of 160 degrees Celsius. This results in a reactive intermediate in the first step synthesis reaction. The reactive intermediate is then cooled down to 90 degrees Celsius, and thereafter 319.7 g of 4,4'-diphenylmethane diisocyanate ($Y_2$) is combined thereinto, followed by 1 hour reaction at 150 rpm, at a nitrogen flow of 0.1 L/min, and at a system temperature of 120 degrees Celsius. Subsequently, 89.3 g of benzyl alcohol and 635.4 g of N,N-dimethylformamide are combined thereinto to terminate the reaction. This results in polyamide-imide resin H having a viscosity of from approximately 2000 to 3000 mPa·s measured with an E-type viscometer. Following that, the polyamide-imide resin H is applied to around a copper wire having a conductor diameter of 0.82 mm. This is baked, thereby resulting in the insulated electric wire having the 45 μm insulating coating layer.

Comparative Example 3

Polyamide-Imide Resin I Synthesis

In a flask with a stirrer, a reflux condenser tube, a nitrogen inlet tube, and a thermometer, 446.5 g of 2,2-bis[4-(4-aminophenoxy)phenyl]propane (BAPP) and 449.3 g of trimellitic anhydride (TMA) are combined, and 2515.9 g of N-methyl-2-pyrrolidone is added as a solvent, followed by 6 hour reaction at a stirring of 180 rpm, at a nitrogen flow of 1 L/min, and at a system temperature of 180 degrees Celsius. This results in a reactive intermediate in the first step synthesis reaction. The reactive intermediate is then cooled down to 90 degrees Celsius, and thereafter 313.4 g of diisocyanate component (Y) produced of a 5-95 mixture of 2,4'-diphenylmethane diisocyanate ($Y_1$) and 4,4'-diphenylmethane diisocyanate ($Y_2$) (i.e. $Y_1$ mol percent=5%) is combined thereinto, followed by 4 hour reaction at a stirring of 150 rpm, at a nitrogen flow of 0.1 L/min, and at a system temperature of 140 degrees Celsius. Subsequently, 88.4 g of benzyl alcohol and 628.9 g of N,N-dimethylformamide are combined thereinto to terminate the reaction. This results in polyamide-imide resin I having a viscosity of from approximately 2000 to 3000 mPa·s measured with an E-type viscometer. Following that, the polyamide-imide resin I is applied to around a copper wire having a conductor diameter of 0.82 mm. This is baked, thereby resulting in the insulated electric wire having the 45 μm insulating coating layer.

Comparative Example 4

Polyamide-Imide Resin J Synthesis

In a flask with a stirrer, a reflux condenser tube, a nitrogen inlet tube, and a thermometer, 446.5 g of 2,2-bis[4-(4-aminophenoxy)phenyl]propane (BAPP) and 449.3 g of trimellitic anhydride (TMA) are combined, and 2515.9 g of N-methyl-2-pyrrolidone is added as a solvent, followed by 6 hour reaction at 180 rpm, at a nitrogen flow of 1 L/min, and at a system temperature of 180 degrees Celsius. This results in a reactive intermediate in the first step synthesis reaction. The reactive intermediate is then cooled down to 90 degrees Celsius, and thereafter 313.4 g of diisocyanate component (Y) produced of a 95-5 mixture of 2,4'-diphenylmethane diisocyanate ($Y_1$) and 4,4'-diphenylmethane diisocyanate ($Y_2$) (i.e. $Y_1$ mol percent=95%) is combined thereinto, followed by 4 hour reaction at a stirring of 150 rpm, at a nitrogen flow of 0.1 L/min, and at a system temperature of 140 degrees Celsius.

Subsequently, 88.4 g of benzyl alcohol and 628.9 g of N,N-dimethylformamide are combined thereinto to terminate the reaction. This results in polyamide-imide resin J having a viscosity of from approximately 2000 to 3000 mPa·s measured with an E-type viscometer. But no insulated electric wire is produced due to low viscosity.

Property Test

Partial Discharge Inception Voltage (PDIV)

For each of the resultant insulated electric wires of Comparative examples 1 to 4, the partial discharge inception voltage (PDIV) is measured as with the Examples. Results thereof are shown in Table 2.

Flexibility

For each of the resultant insulated electric wires of Comparative examples 1 to 4, the flexibility is evaluated as with the method described in the Examples.

Twist Test

For each of the resultant insulated electric wires of Comparative examples 1 to 4, the twist test is performed as with the method described in the Examples.

Peel Test

For each of the resultant insulated electric wires of Comparative examples 1 to 4, the peel test is performed as with the method described in the Examples.

From Tables 1 and 2, Examples 1 to 6, which have a 2,4'-diphenylmethane diisocyanate ($Y_1$) mixing rate of from 10 to 90 mol %, have excellence in all of the flexibility, twist test, peel test and PDIV. Examples 1 to 6 all show an acceptance in e.g. the flexibility with a target flexibility of 30% elongation 1d (self-diameter winding), which serves as an indicator of mechanical strength.

Comparative examples 1, 2 and 3, which have 2,4'-diphenylmethane diisocyanate ($Y_1$) mixing rates of 0 mol %, 0 mol % and 5 mol % respectively, are poorer in the properties than Examples 1 to 6, and Comparative example 4, which has a 2,4'-diphenylmethane diisocyanate ($Y_1$) mixing rate of 95 mol %, produces no insulated electric wire, as described below. Comparative examples 1, 2 and 3 show e.g. 4d, 2d and 2d respectively in the flexibility, and therefore fails respectively in the flexibility of the 30% elongation 1d (self-diameter winding). With reference to the other properties, Comparative example 1 (versatile polyamide-imide resin enameled wire) is good in the twist test and the peel test, but low in the PDIV due to large polarity per repeat unit (high in the rate of the imide group and the amide group present in the resin, in comparison to the others). In all of the twist test, peel

TABLE 1

| | | | | Example 1 | Example 2 | Example 3 | Example 4 | Example 5 | Example 6 |
|---|---|---|---|---|---|---|---|---|---|
| Composition | Resin component (X) | Diamine component | BAPP (g) (mol) | 446.5 (1.089) | 446.5 (1.089) | 446.5 (1.089) | 446.5 (1.089) | 446.5 (1.089) | 446.5 (1.089) |
| | | Acid component | TMA (g) (mol) | 449.3 (2.339) | 449.3 (2.339) | 449.3 (2.339) | 449.3 (2.339) | 449.3 (2.339) | 449.3 (2.339) |
| | Diisocyanate component (Y) | 2,4-MDI ($Y_1$) (mol %) | | 50 | 40 | 25 | 80 | 90 | 10 |
| | | 4,4-MDI ($Y_2$) (mol %) | | 50 | 60 | 75 | 20 | 10 | 90 |
| Property test | Flexibility acceptable 30% elongation 1d | 30% elongation | | 1d | 1d | 1d | 1d | 1d | 1d |
| | Twist test | | | 186 | 173 | 147 | 193 | 188 | 137 |
| | Peel test | | | 94 | 88 | 79 | 99 | 96 | 61 |
| | PDIV (Vp) | | | 1000 | 998 | 989 | 993 | 985 | 992 |

(Note)
BAPP: 2,2-bis[4-(4-aminophenoxy)phenyl]propane
TMA: trimellitic anhydride
2,4-MDI: 2,4'-diphenylmethane diisocyanate
4,4-MDI: 4,4'-diphenylmethane diisocyanate
mol %: mol percent

TABLE 2

| | | | | Comparative example 1 | Comparative example 2 | Comparative example 3 | Comparative example 4 |
|---|---|---|---|---|---|---|---|
| Composition | Resin component (X) | Diamine component | BAPP (g) (mol) | — | 446.5 (1.089) | 446.5 (1.089) | 446.5 (1.089) |
| | | Acid component | TMA (g) (mol) | 634.5 (3.3) | 449.3 (2.339) | 449.3 (2.339) | 449.3 (2.339) |
| | Diisocyanate component (Y) | 2,4-MDI ($Y_1$) (mol %) | | 0 | 0 | 5 | 95 |
| | | 4,4-MDI ($Y_2$) (mol %) | | 100 | 100 | 95 | 5 |
| Property test | Flexibility acceptable 30% elongation 1d | 30% elongation | | 4d | 2d | 2d | — |
| | Twist test | | | 123 | 132 | 136 | — |
| | Peel test | | | 81 | 60 | 61 | — |
| | PDIV (Vp) | | | 887 | 963 | 961 | — |

(Note)
BAPP: 2,2-bis[4-(4-aminophenoxy)phenyl]propane
TMA: trimellitic anhydride
2,4-MDI: 2,4'-diphenylmethane diisocyanate
4,4-MDI: 4,4'-diphenylmethane diisocyanate
mol %: mol percent test and PDIV, Comparative examples 2 and 3 are comparable to Examples 1 to 6, but are considered as having been unable to satisfy the flexibility due to the insufficient softening component. Comparative example 4, which has a 2,4'-diphenylmethane diisocyanate (Y₁) mixing rate of 95 mol %, has formed no enameled wire due to no increase in viscosity, i.e. molecular weight during synthesis, and has consequently not been evaluated.

The azeotropic method has been used in Examples 1 to 6, but not in Comparative examples 1 to 4. It is considered that the use of the azeotropic method has allowed the effective enhancement of the flexibility without lowering the PDIV value, because it can remove (distil) water, which causes a reaction with the acid component (TMA) or the isocyanate component, from the system, and thereby prevent a decrease in their reactivity. Also, in all the Examples and the Comparative examples, it has been observed by visual inspection that each resultant final insulated electric wire has a good appearance without the occurrence of grains or bubbles.

Although the invention has been described with respect to the above embodiments, the above embodiments are not intended to limit the appended claims. Also, it should be noted that not all the combinations of the features described in the above embodiments are essential to the means for solving the problems of the invention.

What is claimed is:

1. An insulating varnish, comprising:
   a polyamide-imide resin consisting of a repeat unit represented by Formula (1) below derived from a synthesis reaction between a resin component (X) and a diisocyanate component (Y),
   wherein the resin component (X) is derived from a synthesis reaction between a diamine component comprising at least one aromatic diamine comprising a divalent aromatic group (R) comprising three or more aromatic rings, and an acid component in the presence of an azeotrope solvent, and
   the diisocyanate component (Y) consists of a 2,4'-diphenylmethane diisocyanate (Y₁) and a 4,4'-diphenylmethane diisocyanate (Y₂);

Formula (1):

in Formula (1), R denotes the divalent aromatic group comprising three or more aromatic rings, and m and n denote an integer of from 1 to 99, wherein the molar content of the 2,4'-diphenylmethane diisocyanate (Y₁) based on the total diisocyanate component (Y) ranges from 40 to 90 mole %.

2. The insulating varnish according to claim 1, wherein the at least one aromatic diamine comprising a divalent aromatic group (R) comprising three or more aromatic rings comprises at least one compound selected from the group consisting of a 2,2-bis[4-(4-aminophenoxy)phenyl]propane (BAPP), bis[4-(4-aminophenoxy)phenyl]sulfone, bis[4-(4-aminophenoxy)phenyl]ether, 9,9-bis(4-aminophenyl)fluorene, 4,4'-bis(4-aminophenoxy)biphenyl, 1,4-bis(4-aminophenoxy)benzene, and isomers thereof.

3. The insulating varnish according to claim 2, wherein the azeotrope solvent comprises xylene.

4. The insulating varnish according to claim 1, wherein the molar content of the 2,4'-diphenylmethane diisocyanate (Y₁) based on the total diisocyanate component (Y) ranges from 40 to 80 mole %.

5. An insulating varnish producing method, comprising:
   making a synthesis reaction between a diamine component comprising at least one aromatic diamine comprising a divalent aromatic group (R) comprising three or more aromatic rings, and an acid component in the presence of an azeotrope solvent, to produce a resin component (X); and
   making a synthesis reaction between the resultant resin component (X), and a diisocyanate component (Y) consisting of a 2,4'-diphenylmethane diisocyanate (Y₁) and a 4,4'-diphenylmethane diisocyanate (Y₂), to produce an insulating varnish containing a polyamide-imide resin consisting of a repeat unit represented by Formula (1) below;

Formula (1):

in Formula (1), R denotes the divalent aromatic group comprising three or more aromatic rings, and m and n denote an integer of from 1 to 99, wherein the molar content of the 2,4'-diphenylmethane diisocyanate ($Y_1$) based on the total diisocyanate component (Y) ranges from 40 to 90 mole %.

6. The insulating varnish producing method according to claim 5, wherein
the at least one aromatic diamine comprising a divalent aromatic group (R) comprising three or more aromatic rings comprises at least one compound selected from the group consisting of a 2,2-bis[4-(4-aminophenoxy)phenyl]propane (BAPP), bis[4-(4-aminophenoxy)phenyl]sulfone, bis[4-(4-aminophenoxy)phenyl]ether, 9,9-bis(4-aminophenyl)fluorene, 4,4'-bis(4-aminophenoxy)biphenyl, 1,4-bis(4-aminophenoxy)benzene, and isomers thereof.

7. The insulating varnish producing method according to claim 5, wherein
the azeotrope solvent comprises xylene.

8. An insulated electric wire, comprising:
a conductor or another insulating coating; and
the insulating varnish according to claim 1 applied thereto and baked to form an insulating coating.

9. The insulated electric wire according to claim 8, having a substantially rectangular cross section.

10. An insulated electric wire producing method, comprising:
applying the insulating varnish according to claim 1 to a conductor having a circular cross section, and baking it to thereby form an insulating coating; and
rolling the conductor and the insulating coating, to form an insulated electric wire having a substantially rectangular cross section.

* * * * *